(12) United States Patent
McKee et al.

(10) Patent No.: US 7,141,306 B1
(45) Date of Patent: Nov. 28, 2006

(54) SOL-GEL COMPOSITION AND PROCESS FOR COATING AEROSPACE ALLOYS

(75) Inventors: Todd M. McKee, Derby, KS (US); Guru Prasad Sundararajan, Bangalore (IN)

(73) Assignee: Cessna Aircraft Company, Wichtta, KS (US)

( * ) Notice: Subject to any disclaimer, the term of this patent is extended or adjusted under 35 U.S.C. 154(b) by 82 days.

(21) Appl. No.: 10/843,977

(22) Filed: May 13, 2004

(51) Int. Cl.
*B32B 15/08* (2006.01)
*B05D 5/10* (2006.01)
*B05D 7/14* (2006.01)

(52) U.S. Cl. .................. 428/447; 427/226; 427/309; 427/387; 106/287.13; 106/287.14; 106/287.16

(58) Field of Classification Search ........... 106/287.13, 106/287.14, 287.16; 427/226, 309, 387; 428/447
See application file for complete search history.

(56) References Cited

U.S. PATENT DOCUMENTS

| | | | |
|---|---|---|---|
| 4,754,012 A * | 6/1988 | Yoldas et al. | 528/10 |
| 5,108,793 A | 4/1992 | Van Ooij et al. | |
| 5,292,549 A | 3/1994 | Van Ooij et al. | |
| RE34,675 E * | 7/1994 | Plueddemann | 106/287.1 |
| 5,660,884 A | 8/1997 | Crook et al. | |
| 5,750,197 A * | 5/1998 | van Ooij et al. | 427/308 |
| 6,403,164 B1 | 6/2002 | Jonschker et al. | |
| 6,579,472 B1 | 6/2003 | Chung et al. | |
| 6,607,590 B1 * | 8/2003 | Jin et al. | 106/287.12 |

* cited by examiner

*Primary Examiner*—David M. Brunsman
(74) *Attorney, Agent, or Firm*—Robert O. Blinn

(57) ABSTRACT

An anti-corrosive sol-gel composition and process for coating an aerospace alloy substrate with the composition.

39 Claims, No Drawings

SOL-GEL COMPOSITION AND PROCESS FOR COATING AEROSPACE ALLOYS

BACKGROUND OF THE INVENTION

1. Field of the Invention

The present invention relates to a process for metal finishing of aerospace alloys for structural adhesive bonding and corrosion protection. More particularly, the process comprises applying an aqueous solution containing an epoxy-functional organosilane and a cross-linking silane to a clean or etched surface of an aerospace alloy. The surface is etched without grit blasting.

Almost all metals are subject to corrosion, particularly atmospheric corrosion. This corrosion affects the quality of the metals, and hence the quality of the final products prepared from the metals. Also, removal of corrosion from the metal surface is both time consuming and economically unfavorable. If it is desired to coat the metal surface with a paint, an adhesive or a rubber, then corrosion of the base metal can cause poor adhesion of paint, adhesive or rubber to the metal. With poor adhesion of a coating, the final product is subject to further corrosion.

2. Description of the Related Art

In the prior art, processes for improving the corrosion resistance of metals included passivating the metal surface by means of a chromate treatment. However, chromium is proven to be highly toxic, carcinogenic and harmful to the environment. It has also been disclosed to employ a phosphate conversion coating in conjunction with a chromate rinse to provide corrosion resistance to a metal surface such as aluminum and magnesium. However, even minor use of chromium should be avoided. In general, phosphate conversion coating is not effective without the chromate rinse.

In recent years, use of chromium has been working toward elimination in favor of a treatment for metal surfaces which comprises coating the metal surface with an inorganic silicate followed by treating the silicate coating with an organofunctional silane (U.S. Pat. No. 5,108,793). Another process involves the rinsing of an aluminum sheet with a solution containing an organofunctional silane and a cross-linking agent to provide temporary corrosion protection. A dense siloxane film can be formed on the metal (U.S. Pat. No. 5,292,549). However, the organofunctional silane does not bond well to the metal surface, and the dense siloxane film can be easily rinsed off.

Many other techniques for corrosion protection of metal surfaces including aerospace alloys, have been disclosed. Some of these techniques are as follows:

U.S. Pat. No. 6,579,472 to Chung et al. discloses an anti-corrosive sol-gel that is a combination of an organometallic salt, an organosilane, and a borate, phosphate, or zinc functional component. The functional components of the sol-gel are combined with an organic acid prior to its application to metal.

U.S. Pat. No. 6,403,164 to Jonschker et al. discloses a process for protecting a metallic substrate against corrosion by coating with a composition having a polysiloxane or heteropolysiloxane and having a component derived from at least one metal of the metallic substrate.

U.S. Pat. No. 5,660,884 to Crook et al. discloses a two-step process for treating a titanium or titanium alloy surface with an alkaline aqueous silicate solution. A solution of an alkali metal metasilicate is preferred because of its buffering capacity. The '884 patent discloses a silicate ratio of about 0.004 molar to about 0.04 molar.

U.S. Pat. No. 5,292,549 to van Ooij et al. discloses a metallic coated steel sheet having a thin siloxane film for providing temporary corrosion protection. The siloxane film is formed by rinsing the metallic coated steel sheet with an organic silane and a cross-linking agent. In the '549 patent, the silane coating is formed from a solution containing 0.5–2.0 vol. % of silane and 0.1–1.0 vol. % of cross-linking agent.

None of the above-referenced patents, taken either individually or in combination, anticipate the present invention as claimed.

SUMMARY OF THE INVENTION

It is an object of the present invention to provide an improved process of coating aerospace alloys to prevent corrosion and improve adhesive bonding.

It is another object of the present invention to provide an improved coating composition, which composition is easy to apply and cost effective. The composition allows for corrosion resistance and strong adhesion to paint adhesives and rubber coatings. The composition is chromate-free and comprises an anti-corrosive sol-gel comprising an epoxy-functional organosilane monomer and a silane cross-linking agent. Preferably, the coating composition is applied to a metal surface, and more particularly, to an aluminum or titanium surface. The aluminum or titanium surface includes alloys, most preferably aerospace alloys.

It is yet another object of the present invention to provide an improved process for coating metals. The process comprises the steps of etching a metal substrate and then coating the etched substrate with an aqueous sol-gel composition. The composition comprises an epoxy-functional organosilane monomer and a silane cross-linking agent. If the metal substrate is aluminum, or an alloy thereof, then an acidic etchant is typically employed to prepare the metal substrate. When the metal substrate is titanium, or an alloy thereof, then a basic material is typically used to etch the metal substrate.

After etching the metal substrate, the coating material can be applied by various methods including immersion, rinsing, spraying, brushing and the like. The process also includes the step of heating or drying the coated metal substrate to obtain a highly cross-linked coating material which adheres strongly to the metal substrate. The highly cross-linked coating material contains free epoxy groups. These epoxy groups allow the coated substrate to receive a paint, an adhesive composition or a rubber material. The paint, adhesive or rubber material is bonded firmly to the metal substrate by means of the free epoxy groups. Aerospace adhesives and paints are preferred.

The process of the present invention employs a controlled amount of cross-linking agent to provide for a durable, anti-corrosive surface coating on the metal surface of an aerospace structure. The process also allows for the elimination of a grit-blasting step for preparing the metal surface. The process is thus more convenient to practice and more economical than prior art processes including processes employing the Boe-Gel® composition.

DETAILED DESCRIPTION OF THE INVENTION

The present invention will be described more fully hereinafter, in which preferred embodiments of the invention are shown. The invention presently disclosed can be embodied in many different forms and should not be construed as limited to the embodiments set forth herein. These embodiments are provided so that this disclosure will be thorough and complete, and will fully convey the scope of the invention to those skilled in the art.

By "epoxy-functional" is meant an organic compound which contains a free epoxide group as a chemical moiety. The compound can contain more than one epoxide group. Another name for an epoxide group is an oxirane group. By "free" is meant an epoxide group whose ring structure is not opened as by attack from another chemical species. Rather, a free epoxide group is one that has the potential for attack by another chemical species.

By "cross-linking agent" is meant a compound which has the ability to chemically join together other molecules in order to create a network of molecules linked together. A silane cross-linking agent is one which contains at least one silicon atom. In the present invention, the cross-linking agent, as defined, contains at least two silicon atoms.

By "tri-radical" is meant three separate functional moieties attached to the same atom. In the present invention, the term "tri-radical silane group" refers to three separate functional moieties attached to the same silicon atom. The three separate functional moieties can be chemically equivalent, e.g., all three radicals can be methoxy. Alternatively, the three separate functional moieties can be chemically dissimilar, e.g., methoxy, ethoxy, and propyloxy.

By "pre-coated" is meant a substrate coated with a pre-polymerized coating composition. The pre-polymerized composition is then further treated, as by heat or light, to obtain a polymerized coating. Polymerization includes a cross-linking step.

By "hydrolytically eliminable" is meant a radical or functional moiety which has the potential to be removed from the compound by contact with water. In the present invention, a hydroxyl moiety replaces the original, hydrolytically eliminable, moiety. In a preferred embodiment, all three hydrolytically eliminable moieties on each silicon atom in the silane cross-linking compound are replaced with a hydroxyl moiety.

By "ratio" is meant a ratio based on the atomic weights of the particular atoms contained in specific compounds. In the present invention, a ratio is based on the molecular weights of the individual compounds, which are the epoxy-functional silane monomer and the silane cross-linking agent.

By "aerospace alloy" is meant a metal blend useful in airplanes, specifically jet planes. It can also be used in rockets, satellites, space shuttles, modules, planetary rovers and the like. In the present invention, the base metal of the aerospace alloy is preferably aluminum or titanium.

The aqueous sol-gel composition of the present invention comprises at least one epoxy-functional silane monomer and at least one silane cross-linking agent. The silane cross-linking agent is a compound which comprises at least two tri-radical silane groups. Each radical can be the same or different, and is directly attached to a silicon atom. The radicals are hydrolytically eliminable.

The composition contains water and, optionally, an organic solvent such as n-hexane, methanol, or the like. Methods of preparing sol-gel compositions are well known to one of ordinary skill in the art, and, as such, form no novel part of the present invention. Any method which is practicable can be employed to prepare the sol-gel composition.

The silane cross-linking agent contains at least two tri-substituted silyl groups, wherein the constituents are selected from the group consisting of $C_1$–$C_6$ alkoxy, halogen and $C_1$–$C_6$ acyloxy. The two tri-substituted silyl groups can be directly bonded to each other, or connected to each other by means of an aliphatic or aromatic bridge. The bridge can be chosen from the group consisting of $C_1$–$C_6$ alkyl, $C_1$–$C_6$ alkenyl, and o-, m-, or p-phenyl. The phenyl group can be substituted with hydrocarbyl substituents. No other functional groups are present in the cross-linker silane compounds.

The epoxy-functional silane monomer contains at least one free epoxy group, and can have two or more epoxy groups. The monomer also contains hydrolysable groups such as alkoxy or acyloxy. Such groups allow the monomer to undergo condensation reactions with the silane cross-linking agent. Preferably, the epoxy-functional silane monomer is a glycidyloxy-($C_2$–$C_6$ alkyl)trialkoxy silane. More preferably, the monomer is gamma-glycidyloxy-propyl trimethoxysilane. The three methoxy radicals are attached directly to the silicon atom, and are hydrolytically eliminable radicals. More than one monomer can be employed in the sol-gel composition.

Examples of glycidyloxy-($C_2$–$C_6$ alkyl)trialkoxy silane are:

3-glycidyloxy propyl trimethoxysilane,
3-glycidyloxy propyl triethoxysilane,
3-glycidyloxy propyl tripropyloxysilane,
3-glycidyloxy propyl tributoxysilane (GTBS),
3-glycidyloxy propyl triisppropoxysilane,
3-glycidyloxy propyl triisobutoxysilane,
3-glycidyloxy propyl tri(sec-butoxy)silane,
3-glycidyloxy propyl tritertbutoxysilane,
3-glycidyloxy propyl dimethoxyethoxysilane,
3-glycidyloxy propyl diethoxymethoxysilane,
3-glycidyloxy propyl dimethoxypropoxysilane,
3-glycidyloxy propyl dipropoxymethoxysilane,
3-glycidyloxy propyl diethoxypropoxysilane,
3-glycidyloxy propyl dipropoxyethoxysilane,
3-glycidyloxy propyl methoxyethoxypropoxysilane,
4-glycidyloxy butyl trimethoxysilane,
4-glycidyloxy butyl triethoxysilane,
4-glycidyloxy butyl tripropoxysilane,
4-glycidyloxy butyl tributoxysilane,
4-glycidyloxy butyl triisopropoxysilane,
4-glycidyloxy butyl tributoxysilane,
4-glycidyloxy butyl tri(sec-butoxy)silane,
4-glycidyloxy butyl tritertbutoxysilane,
4-glycidyloxy butyl dimethoxyethoxysilane,
4-glycidyloxy butyl diethoxymethoxysilane,
4-glycidyloxy butyl dimethoxypropoxysilane,
4-glycidyloxy butyl dipropoxymethoxysilane,
4-glycidyloxy butyl diethoxypropoxysilane,
4-glycidyloxy butyl dipropoxyethoxysilane, and
4-glycidyloxy butyl methoxyethoxypropoxysilane.

Examples of the silane cross-linking agent are:
1,2-bis(triethoxysilyl)ethane,
1,2-bis(trichlorosilyl)ethane,
1,2-bis(trimethoxysilyl)ethane,
1,2-bis(tri(n-propyloxy)silyl)ethane,
1,2-bis(diethoxychlorosilyl)ethane,
1,2-bis(dichloroethoxysilyl)ethane,
1,2-bis(triisopropylsilyl)ethane,
1,2-bis(diethoxymethoxysilyl)ethane,
1,2-bis(dichloromethoxysilyl)ethane,
1,3-bis(triethoxysilyl)propane,
1,3-bis(trichlorosilyl)propane,
1,3-bis(trimethoxysilyl)propane,
1,4-bis(triethoxysilyl)butane,
1,4-bis(trimethoxysilyl)butane,
1,4-bis(trichlorosilyl)butane, 1,4-bis(diethoxymethoxysilyl)butane,
1,1-bis(triethoxysilyl)methane,
1,1-bis(trimethoxysilyl)methane,
1,1-bis(trichlorosilyl)methane,
1,2-bis(triacetoxysilyl)ethane,
1,3-bis(triacetoxysilyl)propane, and
1,4-bis(triacetoxysilyl)butane, The term "sol-gel" is a contraction of the phrase solution-gelation, and it refers to a series of reactions where a soluble metal species (typically a metal alkoxide or a metal salt) hydrolyzes to form a metal hydroxide. The metal hydroxide then condenses or peptizes in solution to form a hybrid organic/inorganic polymer. Different reaction conditions will give different results. The metal polymers can condense into discrete colloidal particles or can grow to form a network gel.

The hydrolysis and condensation reactions are employed in conjunction to provide a network gel in the present invention. Examples of both reactions are given below:

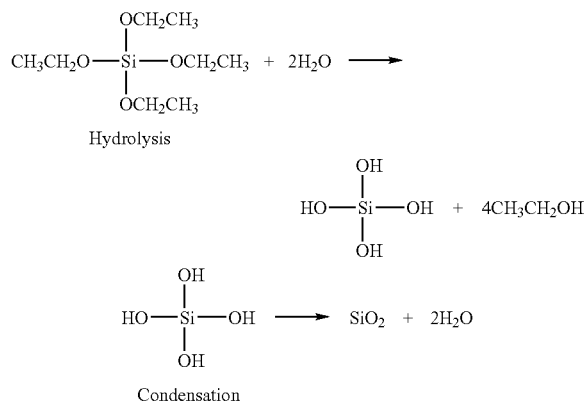

Hydrolysis

Condensation

The above reactions represent complete hydrolysis and condensation reactions. However, the reactions can also be partial.

The "sol-gel" reactions can be conducted in an aqueous solvent; or a mixture of an aqueous solvent and an organic solvent, e.g., hexane and water. A sol-gel film is formed when the reactions are completed and the material is dried. A sol-gel film can also be referred to as a sol coating. The organic portion of the sol coating bonds covalently with an applied layer of paint, adhesive, matrix resin or composites.

The strength and durability of the sol coating depends upon chemical and micro-mechanical interactions at the surface of the metal. The porosity and microstructure of the metal affects adhesion of the sol coating. Also affecting adhesion of sol coating to metal is the tendency of the sol coating to rehydrate. By adjusting the amount of cross-linking agents in the original composition, the sol coating provides high temperature surface stability for paint adhesion, adhesive bonding and fabrication of structurally superior hybrid laminates and matrix resins. The laminates can be metal to rubber or metal to metal and composite to metal.

The aqueous sol-gel composition contains a controlled amount of silane cross-linking agent. To give an improved coating with superior corrosion protection, the amount of silane cross-linking agent is carefully controlled. In a preferred embodiment, the ratio of silane monomer to silane cross-linking agent is from about 9:1 to about 7:3 by value.

The aqueous composition can also contain the customary additives such as colorants, leveling agents, UV stabilizers, photoinitiators, photosensitizers, thermal polymerization catalysts and the like.

The metal substrate to which the coating composition of the present invention is applied can be a pure metal or an alloy. Pure metals can be aluminum and titanium. In a preferred embodiment, the metal substrate is an airplane part; and the airplane part is prepared from an aerospace alloy. Examples of aerospace alloys are aluminum 2XXX and 7XXX series and titanium.

The present invention further relates to a process for preparing a coated metal substrate. The process comprises the steps of cleaning and etching the metal substrate, and contacting the cleaned and etched metal substrate with an aqueous sol-gel composition. The composition comprises at least one epoxy-functional silane monomer and at least one silane cross-linking agent. The cross-linking agent is a compound which comprises at least two tri-radical silane groups, wherein the radical is hydrolytically eliminable. The ratio of silane monomer to silane cross-linking agent is from about 9:1 to about 7:3. Once a pre-coated metal substrate is obtained, it is removed to a heating zone. In the heating zone, the pre-coated metal substrate is heated under conditions of time and temperature which are sufficient to polymerize and harden the sol-gel composition. The pre-coat becomes a highly cross-linked film or coating. The metal substrate is removed from the heating zone and cooled to obtain a coated metal substrate. The coating itself contains free epoxy groups.

Preferably, the metal substrate is an aerospace alloy, the alloy being aluminum-based or titanium-based. When the substrate is aluminum-based, the etching solution for performing the etching step is an acidic composition, such as an aqueous solution of an iron salt. If the substrate is titanium-based, then the etching solution comprises a basic material, such as sodium hydroxide, in dissolved form. A fresh microporous oxide layer is obtained as a result of the etching operation. Processes of etching the metal substrate are well-known in the art and do not need to be described herein. Particular steps of the etching process as such do not form any part of the present invention.

After the step of etching the metal substrate, an aqueous sol-gel composition is obtained. The composition is contacted with the etched metal substrate, and then heated in a heating zone to obtain a highly cross-linked film that has a substantial amount of oxirane (or epoxy) groups. The film firmly adheres to the substrate. A variety of methods can be employed to contact the etched metal substrate with the aqueous sol-gel composition. Examples of methods which can be employed are: dipping, spreading, brushing, knife coating, rolling, spraying, spin coating, screen printing, and curtain coating. Dipping is a preferred method.

The heating zone is maintained at a temperature of about 50° C. to about 300° C. In a preferred embodiment, the heating zone temperature is about 75° C. to about 125° C. The time of heating the coated substrate can be from about a few minutes to about an hour.

After the heating step, the coated substrate containing a highly cross-linked film, is withdrawn from the heating zone and removed to a cooling zone. In a preferred embodiment, the coated substrate is allowed to cool by contact with air under atmospheric conditions.

The sol-gel coating composition is prepared by mixing an epoxy-functional organosilane monomer and a multi-functional silane cross-linking agent in an aqueous medium. The concentration of the organosilane monomer in the aqueous composition is preferably about 0.01% by volume to about 5.0% by volume. Most preferably, the concentration of the organosilane is about 0.1% by volume to about 3.0% by volume. The concentration of the silane cross-linking agent is preferably about 0.5% by volume to about 5% by volume.

In order for the sol gel coating to bond to the metal surface, the above-described organosilane monomer and silane cross-linking agent must be at least partially, and preferably completely, hydrolyzed so that the silane will bond to the metal surface. During hydrolysis, the alkyl or alkenyl group will be replaced with a hydrogen atom. As used herein, the term "partially hydrolyzed" means that only a portion of the alkyl or alkenyl groups on the silane have been replaced with a hydrogen atom. Preferably, the multi-functional silanes should be hydrolyzed to the extent that at least two of the alkyl or alkenyl groups on each molecule have been replaced with a hydrogen atom.

Hydrolysis of the multi-functional silane and epoxy-functional organosilane can be accomplished by mixing the silane and organosilane in water, and optionally including a solvent such as an alcohol in order to improve solubility. The pH of the solution is preferably maintained below about 7 in order to improve hydrolysis. The pH can be adjusted by the addition of an acid to the aqueous composition containing silane and organosilane. Examples of some acids which can be added to the composition are: acetic, oxalic, formic, or propionic acid. Also, since the solubility in water of some of the silanes and organosilanes may be limited, the aqueous composition can optionally include one or more organic solvents, such as alcohols, ketones, aldehydes, ethers and low molecular weight hydrocarbons. Preferred alcohols include: methanol, ethanol, propanol, butanol, and isomers thereof.

The aqueous composition can contain more than one type of organosilane and more than one type of silane cross-linker. Preferably, at least one of the organosilanes is (gamma-glycidyloxypropyl trimethoxysilane; and at least one of the silanes is 1,2-bis(triethoxysilyl)ethane. After all components have been added, the composition is stirred at room temperature for a period of time to begin hydrolysis.

The sol-gel coating composition is prepared by mixing an epoxy-functional organosilane monomer in a medium of water and, optionally, an organic co-solvent. A cross-linking agent is then added to the mixture. The sol-gel mixture is then stirred for about 30 minutes to an hour.

When applied to a metal substrate, the sol-gel coating is preferably about 20 nanometers to about 500 nanometers in thickness. Application of the coating to the substrate can be performed in a variety of ways including immersion, rinsing, spraying and brushing.

The process of the present invention eliminates the need for a grit-blasting step prior to coating the metal substrate. Etching of the metal substrate is sufficient to adhere the coating to the substrate.

In a preferred embodiment, the aqueous sol-gel composition consists essentially of (gamma-glycidyloxypropyl tri-methoxysilane and 1,2-bis(triethoxysilyl)ethane.

The present invention further relates to a process for painting a coated metal substrate. The coated metal substrate, which contains free epoxy groups on a surface thereof, is contacted with a paint composition. An adherent covalent bond is formed between the paint composition and the metal substrate. The paint composition is then allowed to dry to obtain a painted metal substrate. In a preferred embodiment, the paint composition can be a urethane-based paint, an epoxy-based paint, an acrylic-based paint, or a vinyl-based paint. Most preferably, the paint is an aerospace paint.

In the alternative, the coated metal substrate of the present invention can be treated with an adhesive composition or a rubber material.

The coated metal substrate of the present invention comprises the substrate and a highly cross-linked film containing free oxirane groups. The film adheres firmly to the metal substrate, and is prepared from an aqueous sol-gel composition. The composition comprises at least one epoxy-functional silane monomer and at least one silane cross-linking agent. The cross-linking agent is a compound which contains at least two tri-radical silane groups wherein the radical is hydrolytically eliminable. The ratio of silane monomer to silane cross-linking agent is from about 9:1 to about 7:3.

Preferably, the highly cross-linked film has thickness of about 10 nanometers to about 500 nanometers. Most preferably, the thickness of the film is about 100 nanometers to about 200 nanometers. The metal substrate itself is preferably an aerospace alloy. Most preferably, the substrate is an aluminum-based aerospace alloy or a titanium-based aerospace alloy.

We claim:

1. An aqueous sol-gel composition for coating a metal substrate, the composition comprising at least one epoxy-functional silane monomer and at least one silane crosslinking agent, wherein the silane cross-linking agent is a compound which comprises at least two tri-radical silane groups, the tri-radical groups being hydrolytically eliminable, and where the ratio of silane monomer to silane cross-linking agent is from about 12:1 to about 7:4;

and wherein the composition is a completely hydrolyzed sol-gel composition; and wherein the coating composition, upon cross-linking, firmly adheres to the metal substrate by means of chemical covalent bonding.

2. A composition according to claim 1 wherein the epoxy-functional silane monomer is a glycidyloxy-($C_2$–$C_6$ alkyl) trialkoxy silane.

3. A composition according to claim 2 wherein the glycidyloxy-($C_2$–$C_6$ alkyl)trialkoxy silane gamma-glycidyloxypropyltrimethoxysilane.

4. A composition according to claim 1 wherein the hydrolytically eliminable radical is a member selected from the group consisting of $C_1$–$C_6$ alkoxy, halogen and $C_1$–$C_6$ acyloxy.

5. A composition according to claim 4 wherein the hydrolytically eliminable radical is a $C_1$–$C_6$ alkoxy group.

6. A composition according to claim 5 wherein the silane cross-linking agent is 1,2-bis(triethoxysilyl)ethane.

7. A composition according to claim 1 wherein the metal substrate comprises an aerospace alloy.

8. A composition according to claim 7 wherein the aerospace alloy is a member selected from the group consisting of an aluminum alloy and a titanium-alloy.

9. A composition according to claim 1 wherein the ratio of silane monomer to silane cross-linking agent is from about 9:1 to about 7:3.

10. A process for preparing a coated metal substrate comprising the steps of:
   (a) cleaning a metal substrate to obtain a cleaned metal substrate;
   (b) optionally etching the cleaned metal substrate;
   (c) contacting the cleaned or etched metal substrate with an aqueous sol-gel composition, the composition comprising at least one epoxy-functional silane monomer and at least one silane cross-linking agent, wherein the silane cross-linking agent is a compound which comprises at least two tri-radical silane groups, wherein the radical is hydrolytically eliminable, and wherein the ratio of silane monomer to silane cross-linking agent is from about 12:1 to about 7:4; and wherein the composition is a substantially completely hydrolyzed sol-gel composition; to obtain a pre-coated metal substrate;

(d) removing the pre-coated metal substrate to a heating zone;

(e) heating the pre-coated metal substrate in the heating zone under conditions of time and temperature sufficient to polymerize and harden the sol-gel composition;

(f) removing the metal substrate from the heating zone; and (g) cooling the substrate to obtain a coated metal substrate; wherein the polymerized sol-gel composition firmly adheres to the metal substrate by means of chemical covalent bonding.

11. A process according to claim 10 wherein the coated metal substrate of step (g) contains a coating which is a highly cross-linked film containing free oxirane groups.

12. A process according to claim 10 wherein the metal substrate is an aluminum aerospace alloy.

13. A process according to claim 12 wherein the etching procedure is conducted with an acidic composition.

14. A process according the claim 10 wherein the metal substrate is a titanium aerospace alloy.

15. A process according to claim 14 wherein the etching procedure is conducted with a basic composition.

16. A process according to claim 10 wherein the epoxy-functional silane monomer is a glycidyloxy-($C_2$–$C_6$ alkyl) trialkoxy silane.

17. A process according to claim 16 wherein the glycidyloxy-($C_2$–$C_6$ alkyl)trialkoxy silane-glycidyloxypropyl trimethoxysilane.

18. A process according to claim 10 wherein the hydrolytically eliminable radical is a member selected from the group consisting of $C_1$–$C_6$ alkoxy, halogen and $C_1$–$C_6$ acyloxy.

19. A process according to claim 18 wherein the hydrolytically eliminable radical is a $C_1$–$C_6$ alkoxy group.

20. A process according to claim 19 wherein the silane cross-linking agent is 1,2-bis(triethoxysilyl)ethane.

21. A process according to claim 10 wherein the ratio of silane monomer to silane cross-linking agent is from about 9:1 to about 7:3.

22. A process according to claim 10 wherein the metal substrate is contacted with the aqueous sol-gel composition in step (c) by a method which is a member selected from the group consisting of dipping, spreading, brushing, knife coating, rolling, spraying, spin coating, screen printing, and curtain coating.

23. A process according to claim 22 wherein the method of contacting is dipping.

24. A process according to claim 10 wherein the heating of step (e) is conducted at a temperature of about 50° C. to about 300° C.

25. A process according to claim 24 wherein the heating is conducted at a temperature of about 75° C. to about 125° C.

26. A process according to claim 10 further comprising the steps of:

(g). contacting the coated metal substrate with a paint composition, whereby an adherent covalent bond is formed between the paint composition and the metal substrate; and (h). drying the paint composition to obtain a painted metal substrate.

27. A process according to claim 26 wherein the paint composition is a member selected from the group consisting of aerospace paints and aerospace adhesives.

28. A coated metal substrate comprising a substrate and a highly cross-linked film containing free oxirane groups, the film firmly adhering to the metal substrate by means of chemical covalent bonding, and wherein the highly cross-linked film is prepared from an aqueous sol-gel composition comprising at least one epoxy-functional silane monomer and at least one silane cross-linking agent, wherein the silane cross-linking agent is a compound which contains at least two tri-radical silane groups, wherein the radical is hydrolytically eliminable; wherein the composition is a substantially completely hydrolyzed sol-gel composition; and wherein the ratio of silane monomer to silane cross-linking agent is from about 12:1 to about 7:4.

29. A coated metal substrate according to claim 28 wherein the metal substrate is free of grit blasting.

30. A coated metal substrate according to claim 28 wherein the metal substrate is etched.

31. A coated metal substrate according to claim 28 wherein the highly cross-linked film has a thickness of about 10 nanometers to about 500 nanometers.

32. A coated metal substrate according to claim 31 wherein the film has a thickness of about 100 nanometers to 200 nanometers.

33. A coated metal substrate according to claim 28 wherein the epoxy-functional silane monomer is a glycidyloxy-($C_2$–$C_6$ alkyl)trialkoxy silane.

34. A coated metal substrate according to claim 33 wherein the glycidyloxy-($C_2$–$C_6$ alkyl)trialkoxy silane is glycidyloxypropyl trimethoxysilane.

35. A coated metal substrate according to claim 28 wherein the hydrolytically eliminable radical is a member selected from the group consisting of $C_1$–$C_6$ alkoxy, halogen and $C_1$–$C_6$ acyloxy.

36. A coated metal substrate according to claim 35 wherein the hydrolytically eliminable radical is a $C_1$–$C_6$ alkoxy group.

37. A coated metal substrate according to claim 36 wherein the silane cross-linking agent is 1,2-bis(triethoxysilyl)ethane.

38. A coated metal substrate according to claim 28 wherein the substrate comprises an aerospace alloy.

39. A coated metal substrate according to claim 38 wherein the aerospace alloy is a member selected from the group consisting of an aluminum alloy and a titanium alloy.

* * * * *